United States Patent [19]

Adams

[11] 4,073,686

[45] Feb. 14, 1978

[54] BIOLOGICAL PROCESS FOR SCRUBBING SMOKEHOUSE SMOKE

[75] Inventor: Jac Adams, Lake St. Louis, Mo.

[73] Assignee: Krey Packing Company, St. Louis, Mo.

[21] Appl. No.: 760,224

[22] Filed: Jan. 17, 1977

Related U.S. Application Data

[63] Continuation-in-part of Ser. No. 649,913, Jan. 16, 1976, abandoned.

[51] Int. Cl.$^2$ .......................... C12B 1/00; B01D 47/00
[52] U.S. Cl. ........................................ 195/2; 195/116; 195/127; 55/84
[58] Field of Search ...................... 195/2, 4, 116, 3, 8, 195/111; 426/314; 55/84; 210/17

[56] References Cited

U.S. PATENT DOCUMENTS

| | | | |
|---|---|---|---|
| 2,200,581 | 5/1940 | Pruss et al. ............................... | 195/2 |
| 2,793,096 | 5/1957 | Pomeroy ............................ | 195/2 X |
| 3,216,905 | 11/1965 | Baptist ..................................... | 195/2 |
| 3,773,623 | 11/1973 | Hatcher et al. ......................... | 195/60 |
| 3,990,944 | 11/1976 | Gauss et al. ...................... | 195/111 X |

FOREIGN PATENT DOCUMENTS

| | | | |
|---|---|---|---|
| 2,237,929 | 2/1974 | Germany ................................ | 55/84 |

*Primary Examiner*—Lionel M. Shapiro

[57] ABSTRACT

A biological process removes organic smoke particles from meat smokehouses. The effluent gases pass upward through a column containing an air-pervious filler material sprayed with a circulated solution of enzymes and dispersed bacteria. The organic matter is hydrolyzed by the enzymes, yielding small molecules capable of direct, quick metabolism by the bacteria. Since the conditions in the column are adverse to the growth and reproduction, they metabolize without forming sludge. This biological process effectively scrubs the effluent gases at least as rapidly as commercial processes utilizing chemical means.

9 Claims, 1 Drawing Figure

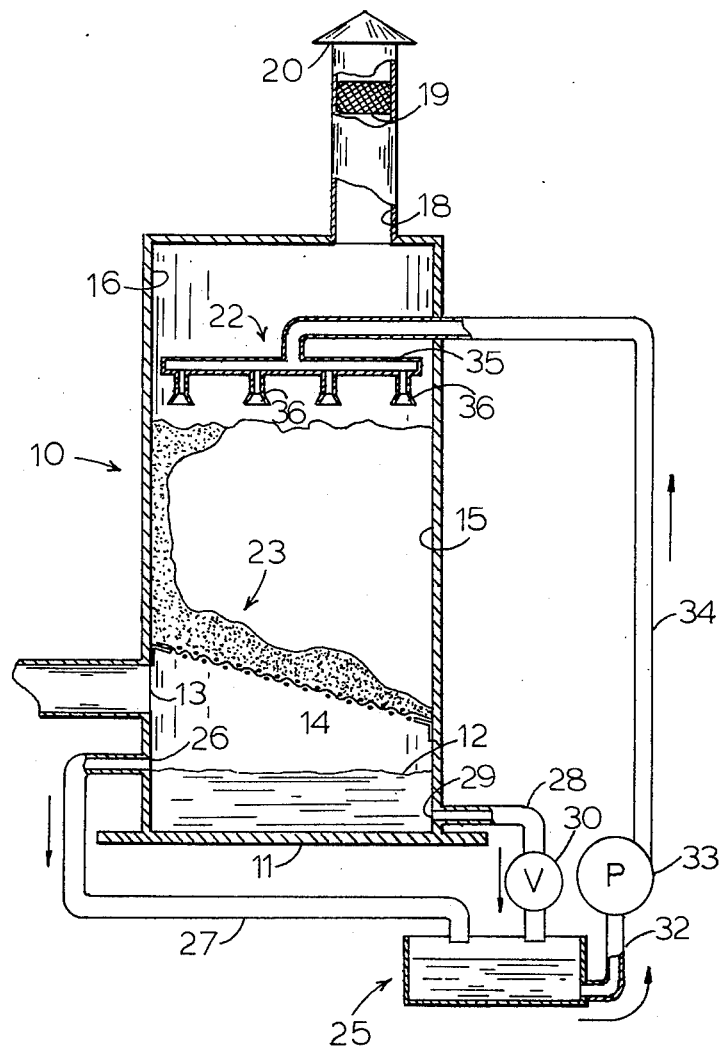

BIOLOGICAL PROCESS FOR SCRUBBING SMOKEHOUSE SMOKE

CROSS REFERENCE TO RELATED APPLICATIONS

This application is a continuation-in-part of co-pending application Ser. No. 649,913 filed Jan. 16, 1976, now abandoned, entitled "Hydrolysis Process for Eliminating Organic Smoke Particles".

FIELD OF THE INVENTION

The present invention relates to bacteriological scrubbers, particularly for meat smoking operations.

BACKGROUND OF THE INVENTION

For scrubbing organic particles present in the smoke from meat smoking plants, one common practice is to convey the smoke through a column containing pervious filler material onto which a caustic solution is sprayed. A substantial part of the organic particles are removed by oxidation but sludge builds up rapidly within the filler material and on the walls of the column; and the caustic may corrode the apparatus.

Biological air purifying systems recently have been utilized as the second stage of a two-stage process for metabolizing organic particles in the gas which flows from a catalyzing chamber, in which odor-producing substances are chemically processed. Such systems rely in their biological second stage on nourishing and cultivating bacteria which produce enzymes capable of hydrolyzing organic particles in air. In such processes a bacterial garden is to be generated in an air-pervious matrix. The prior art teaches the cultivation of a thriving population of bacteria to perform these functions. Supplemental nutrients are provided in order to promote and maintain their balanced growth and reproduction. Organic material contained in air passing through such columns may be metabolized, but slowly and only as a secondary consequence of this biolobical activity of which the production of hydrolyzing enzymes is but a minor part. Thus, only a small proportion of the total metabolic activity of the column represents biodegradation of the particulate matter contained in the air.

The prior art teaches that the effective metabolizing of air-borne particles is achieved only so long as balanced growth is maintained under essentially optimal nutritional circumstances. Balanced growth is physiologically very delicate; the presence of noxious materials in the air or shifts in temperature, pH, or nutrient concentrations readily disrupts the critical balance, which may be impossible to re-establish.

Another problem is a build-up of sludge, resulting from the incomplete metabolism of organic matter derived principally from the supplemental nutrients. Such sludge tends to clog the air flow or to accumulate inconveniently. An inherent limitation in the prior art, as it bears on the rate at which particles can be removed from air, is that the organic macromolecular components of smoke and other such gases consisting of cellulose, proteins, etc., cannot be utilized by bacteria directly, but first must be degraded into their constituents: simple sugars, amino acids, etc. Even a large thriving population of bacteria can slowly produce only limited amounts of the enzymes necessary to effect such degradation. Accordingly it is applicant's conclusion that the rate limiting step in any such process must be the step of initial hydrolysis into metabolizable subunits.

SUMMARY OF THE INVENTION

The principal purpose of the present invention is to provide an effective biological process for removing gaseous and particulate organic matter from rapidly moving smoke and other exhaust gases issuing from meat process operations. Another purpose is to provide an effective bacteriological scrubbing process without sludge formation which operates under conditions which prevent bacterial growth and reproduction. A further purpose is to accelerate the rate-limiting hydrolysis step which makes prior bacterial scrubbing processes unsuitable for commercial use.

Briefly summarizing, these purposes are achieved in the process in which both enzymes and bacteria are added to water which trickles over an air-pervious filler material contained within a scrubbing column. The enzymes attack the organic material contained in air passing through such column, solubilizing it very rapidly and further hydrolyzing it to small molecular subunits capable of direct metabolism by the added bacteria. These bacteria act as microscopic scavengers to absorb and metabolize the hydrolyzed organic materials. Conditions adverse to the growth and reproduction of the bacteria are maintained in the column; hence their number must be supplemented periodically. This absence of bacterial growth avoids by-products thereof, importantly the formation of sludge. The column and its filler material remain clean, to permit continued rapid flow of the air whose organic particles are so removed.

BRIEF DESCRIPTION OF THE DRAWING

The drawing is a partially schematic view of apparatus suitable for carrying out the present biological process for removing organic matter from air.

DESCRIPTION OF THE PREFERRED EMBODIMENT

Apparatus suitable for carrying out the present invention is shown somewhat schematically in the drawing. A scrubber column generally 10 stands on an elevated base 11. The column is preferably cylindrical in cross section. Its lower portion is referred to as its water collecting portion 12; above this is a horizontal air inlet 13 through which smoke may be driven by a fan, not shown, to rise through a metal screen or grating 14 into a filler containing portion 15 thereabove. The top portion of the column 10 is referred to as its head space 16; a vertical outlet 18 therein leads through a conventional screen-type de-mister 19 to a covered outlet vent 20.

Within the head space 16 is mounted an assembly of spray nozzles generally designated 22. Beneath this spray assembly and piled on the screen 14 to substantially fill the portion 15 thereabove is a mass of conventional filler material generally designated 23. This may consist of polyethylene material molded into convoluted strands, such as those sold under the trade name TELLERETTES. When piled together as illustrated, they provide surface areas on which liquid is exposed to air as hereafter described.

Mounted at a level below the base 11 is a supply tank generally designated 25, whose capacity is substantially less than (preferably about one-fourth) that of the water collector portion 12 of the column. An overflow outlet 26 spacedly above the bottom of the water collector portion 12 is connected by a pipe 27 to the upper part of the supply tank 25. As a second connection between the water collector portion 12 and the supply tank 25, a normal flow pipe 28 is provided having an inlet 29 adjacent to the base 11 of the column 10. The normal flow pipe 28 leads through a solenoid valve 30 to empty into the upper portion of the supply tank 25.

Flow from the supply tank 25 to the spray head assembly 22 is provided by a supply conduit 32 leading from the bottom of the supply tank 25 through a pump 33 powered by an electric motor, not shown, and thence through a delivery conduit 34 into a manifold 35 which supplies the spray head assembly 22.

The supply of electricity to the motor which powers the pump 23 and the solenoid valve 30 is so connected by conventional connectors not shown, that the valve 30 remains open so long as the pump 33 is in operation, and otherwise remains closed. The flow capacity of the normal flow pipe 28 and valve 30 is less than, or equals the flow capacity of the pump 33. Hence water in the water collector portion 12 of the column 10 will reach and be maintained at the level of the overflow outlet 25, through which passes the excess flow provided by the pump 33.

Water from the supply tank 25 is pumped upward through the conduit 32 and is discharged into the headspace 16 through the nozzle assembly 22. Such water penetrates downward by gravity through the filler material 23 thereunder and is collected in said lower water collector portion 12 of the column. The normal flow pipe 28 near the base 11 carries the greater part of the water to the supply tank 25, generally carrying with it and circulating any particulate matter contained in the water.

A combination of enzymes and aerobic bacteria, as hereinafter more fully described, is introduced into said water supply tank 25. In the preferred embodiment, the entire volume of water is cycled rapidly so that complete mixing into the water of the added enzymes and bacteria is rapidly achieved. Such circulation maintains a uniform concentration of enzymes and bacteria, and also provides continuous aeration to the aerobic bacteria. The water containing the dissolved enzymes and bacteria, sprayed by the spray heads 36, trickles downward through the air-pervious filler material 23, becoming distributed over a large surface area within its interstices.

Fan-driven air containing particulate and gaseous organic matter enters the scrubbing column 10 via the air inlet 13 and passes upward through said filler material 23 through the headspace 16 and exits through the vertical outlet 18. Excess moisture contained in the air condenses in the conventional de-mister 19 and drips back into the scrubbing column. The air-pervious filler material 23 provides an interface between such air and water trickling downward.

The elimination of organic material from such air depends initially upon the rate of its solubilization, because enzymes and bacteria must act upon such matter in a liquid phase. The organic matter contained in effluent gases of packing plants commonly consists of relatively insoluble agglomerates of macromolecules of protein, carbonhydrates, etc. Partial hydrolysis of these materials by effective enzymes at the gas-liquid interface in the filler material of the scrubbing column produces chemically polar groups (free amino or carboxylic acid groups, etc.) which dramatically increase macromolecular solubility. The hydrolyzing enzymes are specific for the particular species of macromolecules contained in such effluent air. The concentration of such enzymes may be varied so as to be effective upon organic matter of various composition and in various proportions. Proteins, carbohydrates, and fats, which are commonly present in packing house exhausts, are solubilized respectively by these enzymes present in the water: protease, amylase, and lipase. This is a very rapid solubilization step; it provides for effective scrubbing of a large volume of rapidly moving air in contrast to the prior art.

The partly degraded organic macromolecules, now in solution, are further hydrolyzed by the enzymes into smaller subunits. Proteins are degraded into amino acids and small peptides; carbohydrates and cellulose into oligosaccharides and simple sugars; fats into glycerides and fatty acids. Such small organic molecules provide metabolites for the aerobic bacteria present in the water. These metabolites, so taken up and digested by the bacteria, are quickly converted metabolically by the bacteria ultimately to carbon dioxide and water.

This metabolic conversion step after preliminary hydrolysis is very rapid compared to the rate at which bacteria would hydrolyze macromolecules on their own. In this process sufficient concentrations of hydrolyzing enzymes are provided in addition to the bacteria, so that the bacterial activity is directed essentially to up-take and metabolism of small molecules in solution.

Uniquely in the present process such metabolism does not depend upon active growth and reproduction of bacteria, but only upon their transient viability. Once the bacteria die and lyse, their components, like the macromolecules of the input gases, are attacked by the hydrolytic enzymes to yield small molecular subunits which in turn are metabolized by the surviving bacteria.

The present process deliberately maintains conditions hostile to bacterial growth and reproduction. The amount of organic material dissolved in the water is insufficient to support growth of the bacterial population and additions of bacteria must be made periodically to replenish their numbers. Preferably no supplemental nutrients, salts or buffers are added to the water. Metabolic activity is then limited to the up-take of metabolites released by enzymatic hydrolysis of the organic material in the air; in contrast, prior art processes which employ such added nutrients cause secondary growth which results in sludge formation. Here, chance contaminants (fungi, etc.) do not grow, apparently because they are effectively competed against by the overwhelming numbers of dying bacteria which preferentially take up available metabolites. No sludge develops over long periods of operation even though the total concentration of organic materials including the added enzymes may be several milligrams per milliliter. It is believed that the ability of a dying population of bacteria to out-compete microbial contaminants by scavenging metabolites, in conjunction with the inability of the bacteria to reproduce, effectively prevents sludge which is essentially a by-product of microbial growth. After several months of operation, a slight sediment is detected at the bottom of the column, consisting chiefly of denatured enzymes. This sediment does not interfere with the scrubbing process and may be eliminated, if desired, by mere flushing.

Since hostile conditions are employed in this process, the process operates over a wider range of temperature and other physiological factors than conventional bacterial processes. In these, populations of bacteria in a phase of balanced growth are highly sensitive to even minor changes in temperature, levels of nutrients, pH, etc. Such changes will physiologically "shock" the culture causing it to stop growing and thus shutting down the process. Under the biologically hostile conditions maintained in the present invention, fluctuations in these conditions do not alter the effectiveness of the scrubbing process since the bacterial population is already dying. The inherent temperature limitation is that the temperature cannot be so high that the enzymes denature or that bacterial metabolism is totally inhibited, nor so low that all activity ceases. Furthermore, in the present invention smoke or other air containing organic impurities may be introduced intermittently; effectiveness of the process is not interrupted by wide fluctuations in the amount of organic matter present.

Preferably the bacteria and enzymes are added together as a dry powder. The enzymes, which may be semi-pure preparations or crude enzyme extracts from commercial agricultural sources, may thus be mixed according to a formula, the proportion of whose components is found, empirically or by analysis of the input gases, to be specific for the composition of organic matter in such gases. For most purposes, the bacteria may be of any commercially plentiful source and of a species which is not structurally fragile on contact with water. The species of bacteria used may be further selected on the basis of inherent rates of metabolizing various kinds of small molecules, duration of transient viability under adverse conditions, non-pathogenicity, etc. They may be cultured, frozen, and added as a wet paste.

EXAMPLE

A scrubbing apparatus was constructed according to the design shown in the drawing, including a cylindrical column 10 about nine feet high and 52 inches in diameter, and a supply tank 25 with a fluid capacity of 55 U.S. gallons. Approximately 60 cubic feet of Tellerette filler material was placed in the column. The total volume of water was 140 U.S. gallons, circulated at the rate of 6 cycles per hour. Smoke from a packing plant smokehouse was introduced via the air inlet at the rate of 2100 cubin feet per minute. Prior to the addition of enzymes and bacteria, dense smoke billowed forth from the air outlet, indicating that water alone was ineffective in scrubbing the smoke. Dried enzymes and bacteria were then added to the supply tank. Within approximately 15 minutes the smoke emitted was minimal, and within a half hour all visible emission had ceased.

The enzymes and bacteria utilized were those of a commercially available mixture sold for general pollution control purposes. It contained the following concentrations of enzymes:

1. Amylase . . . 18.80 NF Units/Ml. (One NF Unit equals the amount of amylase required to digest one milligram of potato starch in five minutes at 40° C.).

2. Protease . . . 5.16 NF Units/Ml. (One NF Unit equals the amount of enzyme required to digest one milligram of casein in 60 minutes at 40° C.).

3. Lipase . . . 0.28 NF Units/Ml. (One NF Unit of enzyme equals the amount of enzyme required to digest one milli-equivalent per minute of NF olive oil at pH 9 and 37° C.).

In such mixtures cellulase in smaller amounts may be present as well as other enzymes and small quantities of metabolites conventionally used to aid in germinating powdered bacteria.

Empirically it was determined that the daily addition of ¼ to ⅓ the above amounts was sufficient to prevent the emission of any smoke.

The bacteria consisted of a mixed population of smooth strains of gram negative *Enterobacter aerogenes* and *Klebsiella pneumoniae* in a 2 to 1 ratio giving a total concentration of about $2 \times 10^7$ viable cells/ml. Because no exogenous buffers, salts or organic nutrients were added these bacteria die rapidly and must be replenished by further additions.

In one experiment, no additions of bacteria were made after the first charge. At various times thereafter aliquots were withdrawn from the supply tank, diluted serially, and plated on BHI agar plates to determine viability of the circulating population in the column. The following table shows a dramatic decrease in viability with time so that less than 1% of the bacteria survived after 24 hours.

| Time | Viable Cells/Ml. of Water* | Temperature |
|---|---|---|
| 0 | $1.75 \times 10^7$ | 86° F. |
| 8 hrs. | $1.50 \times 10^6$ | 118° F. |
| 24 hrs. | $7.00 \times 10^4$ | 86° F. |
| 32 hrs. | $1.10 \times 10^4$ | 136° F. |

*Average of Triplicate Platings

Note also the wide temperature fluctuation over the course of the experiment. The smoke scrubber was mounted on the asphalt roof of a building where the rays of the sun probably influenced the internal temperature of the tank as well as the high temperature of the smoke itself.

This scrubber was operated for several months according to the protocol given above for daily additions of bacteria and enzymes. During this time no smoke was observed to escape from the air outlet at the top of the column. The tank was then inspected by partially dismantling it and no sludge or deposits were found in the column or in the Tellerette filler material.

CONCLUSION

The present process is highly effective for eliminating air-borne organic smoke particles of varying composition. This is important for commercial smokehouse operations, in which the smoke from a mere smoking process differs in content from the smoke from a pickling operation, for example. The process effectively utilizes simple and inexpensive apparatus, and may be monitored by unskilled personnel, without danger of disrupting any biological garden. It is therefore exceptionally well suited for commercial smokehouse operation, where great quantities of intense smoke must be scrubbed.

I claim:

1. For scrubbing the smokes of meat processing plants, the process comprising the steps of conducting said smoke containing particulate and gaseous organic matter into a column inlet, up through an air-pervious filler material within such column, and toward an outlet of such column, mixing into water hydrolytic enzymes and aerobic bacteria, trickling said water through said filler material thereby to form an interface between said water and said smoke containing particulate and gaseous organic matter, dissolving such particulate and gaseous organic matter by partial hydrolysis with said enzymes at such interface, by said enzymes further hydrolyzing said dissolved partially hydrolyzed matter into metabolizable subunits, maintaining said aerobic bacteria in said mixture without sufficient organic material to support their growth and reproduction, and oxidizing to substantial completion said metabolizable subunits by said aerobic bacteria without causing same to reproduce, whereby such particulate and gaseous organic matter is effectively oxidized to carbon dioxide and water without substantial accumulation of sludge, cell mass, or dissolved byproducts of fermentation.

2. The method as defined in claim 1, wherein said hydrolytic enzymes are those specific for the macromolecular constituents of the said contained organic matter, whereby said organic matter is rapidly and effectively dissolved and hydrolyzed by said enzymes.

3. The method as defined in claim 1, together with the further steps of monitoring the gases escaping from the outlet of such column for the presence of such smokes, and maintaining the concentrations of enzymes and the numbers of said aerobic bacteria at such levels, by additions thereof, as to avoid the presence of such smokes in such escaping gases.

4. The method as defined in claim 1, together with the further steps of collecting in a said smoke atmosphere said trickling water and recirculating said enzyme and bacteria containing water, whereby said water is mixed and aerated.

5. For scrubbing the smoke issuing from meat smoke houses, the process comprising the steps of conducting air at a temperature greater than 140° F. containing particulate and gaseous organic matter into a column inlet, up through an air-pervious filler material within such column, and toward an outlet of such column, mixing into water hydrolytic enzymes and aerobic bacteria, trickling said water through said filler material thereby to form an interface between said water and such heated gas containing particulate and gaseous organic matter, whereupon said water is heated to a temperature adverse to bacterial reproduction, dissolving such particulate and gaseous organic matter by partial hydrolysis with said enzymes at such interface, by said enzymes further hydrolyzing said dissolved partially hydrolysed matter into metabolizable subunits, maintaining said aerobic bacteria in said mixture under conditions adverse to their reproduction, and oxidizing to substantial completion said metabolizable subunits by said aerobic bacteria without causing same to reproduce, whereby such particulate and gaseous organic matter is effectively oxidized to carbon dioxide and water at a temperature too high to sustain bacterial reproduction, but not high enough to prevent metabolism of said bacteria.

6. The method as defined in claim 1, wherein said hydrolytic enzymes include cellulase, whereby to hydrolyze cellulose contained in such smoke.

7. The method as defined in claim 1, wherein said hydrolytic enzymes include protease, whereby to hydrolyze proteinaceous matter contained in such smoke.

8. The method as defined in claim 1, wherein said hydrolytic enzymes include amylase, whereby to hydrolyze carbohydrate matter in such smoke.

9. The method as defined in claim 1, wherein said hydrolytic enzymes include lipase, whereby to hydrolyze fatty matter in such smoke.

* * * * *